March 23, 1937.  G. C. BROWN ET AL  2,074,454
LOW VOLTAGE, PHASE FAILURE, AND PHASE REVERSAL PROTECTIVE MEANS
Filed June 8, 1936
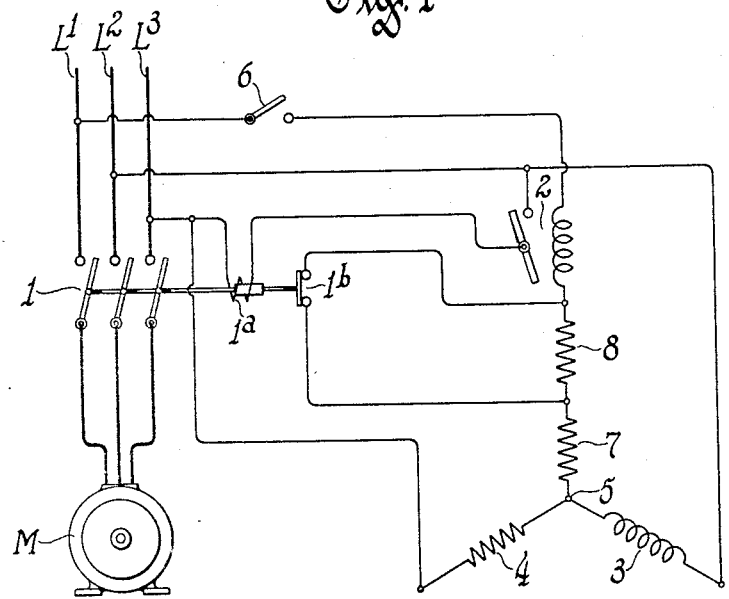
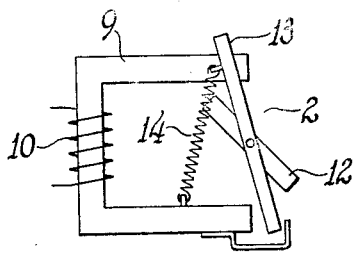
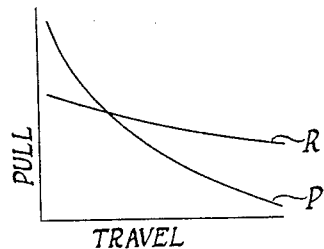
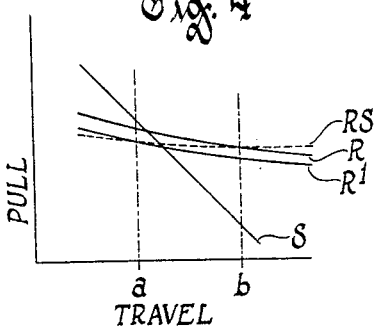

Patented Mar. 23, 1937

2,074,454

UNITED STATES PATENT OFFICE 2,074,454

LOW VOLTAGE, PHASE FAILURE, AND PHASE REVERSAL PROTECTIVE MEANS

Glendon C. Brown and Edwin W. Seeger, Wauwatosa, Wis., assignors to Cutler-Hammer, Inc., Milwaukee, Wis., a corporation of Delaware Application June 8, 1936, Serial No. 84,122

7 Claims. (Cl. 175—294)

This invention relates to low voltage, phase failure and phase reversal protective means for polyphase alternating current circuits.

More particularly the invention relates to that type of protective means comprising an electromagnetic relay having its winding star connected with impedances in a three-wire alternating current circuit, one embodiment whereof is disclosed in the Stevens Patent No. 1,826,099, October 6, 1931. The means disclosed in this patent provide for phase failure and phase reversal protection and also for low voltage protection, assuming the frequency to remain constant. If, on the other hand, the frequency decreases with the voltage low voltage protection is not afforded.

An object of the present invention is to provide means to afford the aforediscussed protection and in addition low voltage protection in the event that the frequency decreases with the voltage.

Another object is to provide protective means of greater sensitivity.

Other objects and advantages of the invention will hereinafter appear.

The accompanying drawing illustrates one embodiment of the invention which will now be described, it being understood that the embodiment illustrated is susceptible of various modifications without departing from the scope of the appended claims.

In the accompanying drawing,

Figure 1 is a diagrammatic view of the protective means applied to an electric motor;

Fig. 2 is a schematic view of a preferred form of relay, while

Figs. 3 and 4 show certain characteristic curves.

Referring to Fig. 1, the same shows a three phase motor M supplied from lines $L^1$, $L^2$ and $L^3$, the continuity of circuit being controlled by an electromagnetic main switch 1. The switch 1 is of a conventional type biased by gravity or other means to open position and having a closing and holding winding $1^a$. Also the main switch 1 has a normally closed auxiliary switch $1^b$ to be opened when said main switch closes.

The protective means comprises a relay 2 having its winding star connected with impedances 3 and 4. The impedance 3 is preferably highly inductive, while the impedance 4 preferably is pure ohmic resistance. The winding of relay 2 is connected between the star point 5 and line $L^1$, through a control switch 6, and has in series with its resistances 7 and 8, the former being permanently included in circuit, and the latter being adapted to be short-circuited by the auxiliary switch $1^b$ of main switch 1. The impedance 3 is connected between the star point 5 and line $L^2$ while the impedance 4 is connected between said star point and line $L^3$, the main switch winding $1^a$ being connected across lines $L^2$ and $L^3$ through the contacts of relay 2.

Relay 2 preferably is of the balanced rotating armature type depicted in Fig. 2. The construction here shown comprises a U-shaped magnet frame 9 carrying a winding 10 and a rotating armature 12 carrying a contact element or contact actuating element 13, said armature being balanced. Also the relay as shown comprises a coiled spring 14 biasing the armature 12 to effect circuit interruption, said spring having characteristics hereinafter explained. The contacts are not shown in Fig. 2, it being obvious that element 13 may be used as a contact to engage another as suggested by the showing of Fig. 1 or to control the circuit in any other desired manner.

Neglecting the resistance 7 it will be understood by those familiar with the aforementioned patented protective means that closure of switch 6 when voltage and phase conditions are normal will cause relay 2 to respond to energize the main switch 1 for connecting the motor to the supply lines. Main switch 1 in responding will open the short-circuit around resistance 8 whereby said resistance will function as in the aforementioned patented system. Also it will be understood that neglecting resistance 7 the relay will function as in said patented system to open on phase failure or phase reversal or low voltage with constant frequency except in the case of low voltage between lines $L^2$ and $L^3$. On the other hand, the main switch 1 has its winding connected directly across lines $L^2$ and $L^3$ and accordingly may be designed to release and afford low voltage protection in the event of low voltage between such lines.

Considering now the resistance 7 it is of such a value as to permit the relay 2 to respond as aforedescribed, whereas it supplements the relay to perform the additional function of responding to a decrease in voltage where the frequency decreases proportionally. As is well known, the magnetic flux of the relay if connected directly across the line will remain constant when voltage and frequency decrease proportionally. On the other hand, inclusion of the resistance 7 in series with the relay winding effects reduction of the magnetic flux of the relay with a simultaneous decrease in voltage and frequency. Assuming, for example, that at normal voltage and frequency the voltage drop through resistance 7 is the same as that through the relay winding the reduction in current supplied to the relay winding resulting from a 50% drop in line voltage and frequency will reduce by approximately 25% the ampere turns of the relay. As a result the pull of the relay will be reduced approximately 50% and the relay will release to deenergize the main switch, thus affording protection in the case of simultaneous voltage and frequency drop as well as in the case of drop in voltage only.

The rotating armature type of relay shown in Fig. 2 has a flatter pull characteristic than the plunger type of relay, whereby there is less variation in pull for different positions of the armature than in the case of the plunger type of relay. The difference in pull characteristics of the rotating armature type of relay and the plunger type of relay is depicted in Fig. 3 wherein P represents the pull curve of the plunger type, and R the pull curve of the rotating armature type. As hereinbefore explained, the armature is balanced and the spring 14 is preferably arranged in such manner that the resulting torque within the range of movement of the armature closely approaches the magnetic torque, as shown in Fig. 4, this being made possible by the aforementioned flat pull characteristic. In Fig. 4, R depicts the torque of the relay for a given voltage, while RS depicts the torque of the spring on the armature, S depicting the pull of the spring in terms of its length. With the torque of the relay as depicted by curve R the relay will be moved to closed position, whereas if the voltage of the relay decreases, lowering the torque of the relay to the value $R^1$, the spring torque throughout the operating range $a$—$b$ exceeds the torque of the relay, causing the relay to open. By correlating the spring characteristic with the torque characteristic of the relay, the relay may be so designed that it will work positively on very small variations in voltage.

An additional advantage of the rotating armature type of relay is that it is possible to put a practically unlimited amount of weight into the armature, thus increasing its inertia and making it immune to mechanical shocks and slow to respond to fluctuations in magnetic pull. The relay may thus be caused to operate on low frequencies, which is especially desirable where the relay is to respond to decrease in voltage and frequency simultaneously.

As will be understood, the resistance 7 instead of being connected in the star branch including the relay winding might comprise two resistances respectively connected in the other two star branches. Also it will be understood that if phase reversal protection is not required the impedances 3 and 4 may both comprise ohmic resistance.

What we claim as new and desire to secure by Letters Patent is:

1. In protective means for polyphase circuits, the combination with a relay having a control winding, of impedances, a star connection for said relay winding and said impedances and resistance permanently in series with said relay winding to render said relay responsive to a decrease in line voltage when simultaneously the frequency decreases.

2. In protective means for polyphase circuits, the combination with a relay having a control winding, of impedances, one of which is inductive, a star connection for said relay winding and said impedances and resistance permanently in series with said relay winding to render said relay responsive to a decrease in line voltage when simultaneously the frequency decreases.

3. In protective means for polyphase circuits, the combination with a relay having a balanced rotating armature and a control winding, of impedances, a star connection for said relay winding and said impedances and resistance permanently in series with said relay winding to render said relay responsive to a decrease in line voltage with a proportional decrease in frequency.

4. In protective means for polyphase circuits, the combination with a relay having a balanced rotating armature, a control winding and a biasing spring for said armature having a pull curve closely approaching the pull curve of said relay, of impedances, a star connection for said relay winding and said impedances and resistance permanently in series with said winding to render said relay responsive to a decrease in line voltage with a proportional decrease in frequency.

5. In protective means for polyphase circuits, the combination with a relay having a control winding, of an electromagnetic main switch controlled by said relay, two impedances, circuit connections affording star connection of said relay winding and said impedances and also affording connection of the winding of said electromagnetic switch between terminals of said impedances and resistance permanently connected in series with said relay winding for the purpose set forth.

6. In protective means for polyphase circuits, the combination with a main switch having a control winding and auxiliary contacts, of an electroresponsive relay to control said main switch, impedances, circuit connections affording star connection of the winding of said relay and said impedances and connection of said main switch winding between terminals of said impedances through contacts of said relay, resistance permanently in series with the winding of said relay and additional resistance in series with said relay winding to be excluded from circuit by said auxiliary contacts of said main switch when said main switch is in a given position.

7. In protective means for polyphase circuits, the combination with an electromagnetic main switch having auxiliary contacts, of an electroresponsive relay to control said main switch, said relay being of the balanced rotating armature type and biased to a given position, impedances, star connections for the winding of said relay and said impedances, a connection for the winding of said main switch extending from the line terminal of one impedance to the line terminal of the other impedance through contacts of said relay, resistance permanently connected in series with the winding of said relay, and additional resistance in series with said relay winding and having a short circuit controlled by said auxiliary contacts of said main switch.

GLENDON C. BROWN.
EDWIN W. SEEGER.